(12) United States Patent
Wessel et al.

(10) Patent No.: US 7,837,964 B2
(45) Date of Patent: Nov. 23, 2010

(54) METHOD FOR REMOVING SULFUR COMPOUNDS FROM GASES CONTAINING HYDROCARBONS

(75) Inventors: Helge Wessel, Mannheim (DE); Markus Hoelzle, Kirchheim (DE); Bernd Vogel, Kassel (DE); Roland Hageboeke, Calden (DE); Michael Hesse, Worms (DE); Norbert Wilden, Voehl (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1504 days.

(21) Appl. No.: 10/539,613

(22) PCT Filed: Dec. 13, 2003

(86) PCT No.: PCT/EP03/14193

§ 371 (c)(1),
(2), (4) Date: Aug. 11, 2005

(87) PCT Pub. No.: WO2004/056949

PCT Pub. Date: Jul. 8, 2004

(65) Prior Publication Data

US 2006/0035784 A1    Feb. 16, 2006

(30) Foreign Application Priority Data

Dec. 19, 2002  (DE) ................. 102 60 028
Jul. 11, 2003   (DE) ................. 103 31 771
Aug. 29, 2003  (DE) ................. 103 40 251
Nov. 4, 2003    (DE) ................. 103 52 104

(51) Int. Cl.
*C10L 3/00*   (2006.01)
*C10L 3/10*   (2006.01)
*C10L 3/12*   (2006.01)

(52) U.S. Cl. ............... 423/220; 423/242.1; 423/244.09; 423/244.1; 48/127.3; 48/127.5; 48/127.7

(58) Field of Classification Search ................ 423/220, 423/242.1, 244.09, 244.1; 48/127.3, 127.5, 48/127.7; 502/344, 340, 305, 325, 517
See application file for complete search history.

(56) References Cited

U.S. PATENT DOCUMENTS 5,003,107 A  *  3/1991  Zimmerman et al. ........ 564/475
5,763,350 A      6/1998  Immel et al.
5,769,909 A      6/1998  Bonk et al.
5,985,227 A  * 11/1999  Immel et al. ............. 423/242.1
6,024,933 A      2/2000  Legendre et al.
2002/0159939 A1 10/2002 Lieftink et al.

FOREIGN PATENT DOCUMENTS

DE    35 25 871    1/1987
EP    1 121 922    8/2001

OTHER PUBLICATIONS

"Erdgasaufbereitung fuer den Einsatz in PEM-Brennstoffzellen" BWK, vol. 54, No. 9, pp. 62-68, 2002.

* cited by examiner

*Primary Examiner*—Timothy C Vanoy
(74) *Attorney, Agent, or Firm*—Oblon, Spivak, McClelland, Maier & Neustadt, L.L.P.

(57) ABSTRACT

The present invention relates to processes for removing sulfur compounds from hydrocarbonaceous gases by using catalysts, with the exception of activated carbons and zeolites, which comprise copper, silver, zinc, molybdenum, iron, cobalt, nickel or mixtures thereof at temperatures of from (−50) to 150° C. and a pressure of from 0.1 to 10 bar.

12 Claims, No Drawings

METHOD FOR REMOVING SULFUR COMPOUNDS FROM GASES CONTAINING HYDROCARBONS

The present invention relates to a process for removing sulfur compounds from hydrocarbonaceous gases in the presence of catalysts which exclude activated carbons and zeolites and comprise copper, silver, zinc, molybdenum, iron, cobalt, nickel or mixtures thereof.

Hydrocarbonaceous gases, for example natural gas, generally contain sulfur compounds or, for safety reasons, must be admixed with malodorous sulfur compounds. On a large scale, natural gas is desulfurized, for example by hydrogenation. However, this is not possible nor expedient for every application.

The hydrogen necessary to operate fuel cells is generally produced from natural gas. Natural gas has the advantage of great availability, since, at least in highly industrialized countries, a close-meshed national gas grid is present. In addition, natural gas has a high hydrogen/carbon ratio and thus makes it possible to prepare a hydrogen-rich reformer gas. The term natural gas describes a multiplicity of possible gas compositions which can vary greatly depending on the well location. Natural gas can consist virtually exclusively of methane ($CH_4$), but in other cases can also have considerable contents of higher hydrocarbon. "Higher hydrocarbons" here means all hydrocarbons from ethane ($C_2H_6$), regardless of whether these are saturated, unsaturated, or even cyclic, hydrocarbons. Typically, the proportions of higher hydrocarbons in the natural gas decrease with increasing molecular weight and vapor pressure. Thus ethane and propane are typically found in the percentage range, whereas, of hydrocarbons having more than 10 carbons, usually only a few ppm are present in the natural gas. Among the higher hydrocarbons are also found cyclic compounds, for example carcinogenic benzene, toluene and xylenes. Each of these compounds can be present in natural gas at concentrations of >100 ppm.

In addition to the higher hydrocarbons in natural gas there are also further impurities which contain heteroatoms. In this connection there are in particular sulfur compounds, which occur in low concentrations in natural gas. Examples of these are hydrogen sulfide ($H_2S$), carbonyl sulfide (COS) and carbon disulfide ($CS_2$).

Methane and natural gas are inherently odorless gases which are not toxic, but in combination with air, can lead to explosive mixtures. To be able to detect an escape of natural gas immediately, natural gas is admixed with malodorous substances at low concentration which, as what are termed odorants, are responsible for the characteristic smell of natural gas. The odorization of natural gas is prescribed by law in most countries, together with the odorants to be used. In some countries, for example the United States of America, mercaptans such as tert-butyl mercaptan or ethyl mercaptan are used as odorants, whereas in the member states of the European Union, usually cyclic sulfur compounds such as tetrahydrothiophene are used. Together with the sulfur compounds which occur naturally in natural gas, this thus gives a multiplicity of different sulfur compounds in natural gas. The differing rules and regulations for the composition of natural gas usually permit up to 100 ppm of sulfur in the natural gas. The situation is similar in the case of liquefied petroleum gas (LPG) as starting material. LPG, which contains propane and butane as main constituents must, just like natural gas, be admixed with sulfur compounds as odor markers.

The sulfur components in natural gas or LPG can lead to severe and irreversible poisoning of the catalysts in the fuel cell or in the reformer. For this reason, the gases which are fed to the fuel cell must be freed from all sulfur components. Fuel cells, for this reason, always contain a desulfurization unit for the natural gas or LPG used. Should the fuel cell be operated with liquid hydrocarbons, for example heating oil, desulfurization is likewise necessary.

Preference is to be given to a process procedure in which the hydrocarbonaceous gas is run through an adsorber in direct passage at room temperature, which adsorber removes as far as possible all sulfur components completely. The adsorber should preferably be capable of being operated at room temperature and atmospheric pressure. Since the adsorber is to be suitable for operation of natural gases of differing compositions, it is in addition of importance that only the sulfur components from the natural gas are adsorbed and coadsorption of higher hydrocarbons is suppressed to a negligible extent. Only under these preconditions is it possible to achieve high adsorptions for sulfur compounds which corresponds to sufficiently long service times. This can avoid the frequent exchange of the adsorber medium.

The coadsorption of higher hydrocarbons, in particular of benzene from natural gas, can in addition cause legal limiting values for benzene contents in the adsorber to be exceeded and it then becomes obligatory to label the adsorber unit (carcinogenic). Such benzene-saturated adsorbers, in addition, cause significant increased expenditure, for example during change of the adsorber medium or during transport of the adsorber to recycling.

EP-A-1 121 977 discloses the removal of organic sulfur components such as sulfides, mercaptans and thiophenes by adsorption from natural gas using silver-doped zeolites at room temperature. A disadvantage is the high silver content.

A further marked disadvantage of the zeolite-based systems is the fact that zeolites readily adsorb in their pore systems all higher hydrocarbons occurring in the gas stream. In particular, cyclic hydrocarbons, for example benzene, are completely adsorbed and can accumulate in the zeolite up to the range of a few % by weight. The examples of EP 1 121 977 A2 in addition demonstrate the efficacy of the inventive catalysts for adsorbing organic sulfur compounds, but not for inorganic sulfur compounds such as $H_2S$ and COS.

US-A-2002/0159939 discloses a two-stage catalyst bed consisting of an X zeolite for removing odorants, and then a nickel-based catalyst for removing sulfur components from natural gas for operation in fuel cells. A disadvantage of this process is that COS cannot be removed directly but only after prior hydrolysis to $H_2S$.

BWK 54 (2002) No. 9 pages 62 to 68 discloses that to date, there is no simple solution for removing all sulfur components from natural gas which interfere with the use in the fuel cell sector.

It is an object underlying the present invention, therefore, to remedy the abovementioned disadvantages and, in particular, to make it possible to use, for fuel cells, hydrocarbonaceous gases which contain sulfur compound impurities.

We have found that this object is achieved by a novel and improved process for removing sulfur compounds from hydrocarbonaceous gases, which comprises using catalysts which exclude activated carbons and zeolites and comprise copper, silver, zinc, molybdenum, iron, cobalt, nickel or mixtures thereof at temperatures of from (−50) to 150° C. and at a pressure of from 0.1 to 10 bar.

The process can be carried out as follows:

The hydrocarbonaceous gas containing sulfur compound impurities can be passed over one or more inventive catalysts at a temperature of from (−50) to +150° C., preferably from (−20) to 80° C., particularly preferably from 0 to 80° C., in particular from 15 to 40° C., very particularly preferably at room temperature, and at a pressure of from 0.1 to 10 bar, preferably from 0.5 to 4.5 bar, particularly preferably from 0.8 to 1.5 bar, in particular at atmospheric pressure.

Suitable hydrocarbonaceous gases containing sulfur compound impurities are, for example, natural gas, town gas, biogas and liquefied petroleum gas (LPG), preferably natural gas and town gas, particularly preferably natural gas.

The sulfur compound impurities are generally COS, $H_2S$, $CS_2$ and also mercaptans and disulfides and commercially added malodorous sulfur compounds added for safety reasons, such as tetrahydrothiophene, ethyl mercaptan, n-butyl mercaptan, t-butyl mercaptan or mixtures thereof.

Suitable inventive catalysts which can also act as adsorbent are those which comprise, preferably consist of, from 1 to 99.8% by weight, preferably from 2 to 85% by weight, particularly preferably from 3 to 75% by weight, in particular from 5 to 70% by weight, of copper, silver, zinc, molybdenum, iron, cobalt, nickel or mixtures thereof and from 0.2 to 99% by weight, preferably from 15 to 98% by weight, particularly preferably from 25 to 97% by weight, in particular from 30 to 95% by weight, of oxides selected from groups IIB, IIIB, IVB, VIB, VIII, IIIA, and IVA of the Periodic Table of the Elements which are solids at least up to 250° C., for example the oxides of magnesium, calcium, scandium, yttrium, lanthanum, titanium, zirconium, chromium, tungsten, boron, aluminum, gallium, silicon, germanium and tin, preferably magnesium, calcium, lanthanum, titanium, zirconium, chromium, aluminum and silicon, particularly preferably magnesium, calcium, titanium, zirconium, aluminum and silicon. The abovementioned oxides selected from groups II B, IIIB, IVB, VIB, VIII, IIIA, and IVA of the Periodic Table of the Elements can optionally be used as support, for example aluminum oxide, titanium dioxide or silicon dioxide.

Among the inventive catalysts, copper catalysts are suitable which comprise, preferably consist of, from 30 to 99.8% by weight, preferably from 40 to 85% by weight, particularly preferably from 50 to 75% by weight, of copper oxide, and from 0.2 to 70% by weight, preferably from 15 to 60% by weight, particularly preferably from 25 to 50% by weight, of oxides selected from groups IIB, IIIB, IVB, VIB, VIII, IIIA, and IVA of the Periodic Table of the Elements which are solids at least up to 250° C., such as zinc, scandium, yttrium, lanthanum, titanium, zirconium, chromium, molybdenum, tungsten, iron, cobalt, nickel, boron, aluminum, gallium, silicon, germanium and tin, preferably zinc, lanthanum, titanium, zirconium, chromium, molybdenum, iron, cobalt, nickel, aluminum and silicon, particularly preferably zinc, lanthanum, titanium, zirconium, nickel, aluminum and silicon. The copper, in this "copper catalysts" can be used in any oxidation state, for example in oxidation state +1 or +2 or elementally (oxidation state=0) or mixtures thereof, preferably in oxidation state +2 or elementally or mixtures thereof, particularly preferably in oxidation state +2.

Among the inventive catalysts, molybdenum catalysts are suitable which comprise, preferably consist of, from 1 to 80% by weight, preferably from 2 to 60% by weight, particularly preferably from 3 to 50% by weight, of molybdenum oxide and from 20 to 99% by weight, preferably from 40 to 98% by weight, particularly preferably from 50 to 97% by weight, of oxides selected from groups IIB, IIIB, IVB, VIB, VIII, IIIA, and IVA of the Periodic Table of the Elements which are solids at least up to 250° C., for example the oxides of magnesium, calcium, zinc, scandium, yttrium, lanthanum, titanium, zirconium, chromium, tungsten, iron, cobalt, nickel, boron, aluminum, gallium, silicon, germanium and tin, preferably magnesium, calcium, zinc, lanthanum, titanium, zirconium, chromium, iron, cobalt, nickel, aluminum and silicon, particularly preferably magnesium, calcium, zinc, titanium, zirconium, cobalt, nickel, aluminum and silicon. The molybdenum, in these "molybdenum catalysts", can be used in any oxidation state, for example in oxidation state +1 to +6, or elementally (oxidation state=0) or mixtures thereof, preferably in oxidation state +2 or +6 or mixtures thereof.

Copper and molybdenum catalysts are a preferred embodiment. The copper and molybdenum catalysts can be used separately in any sequence or mixed, preferably mixed homogeneously, or particularly preferably in the sequence copper catalyst upstream of molybdenum catalyst. Mixtures are generally the simplest variant of the invention and can preferably be used in small-scale use (for example in small fuel cells). In other cases, generally, separating the catalysts in the sequence copper catalyst upstream of molybdenum catalyst is advantageous. Further catalysts, such as are disclosed, for example, by EP-A-1 121 977, can be provided downstream.

The inventive catalysts can be prepared by generally known processes, for example by precipitation, impregnation, mixing, kneading, sintering, spraying, spray drying, ion exchange or zero-current deposition, preferably by precipitation, impregnation, mixing, sintering or spray drying, particularly preferably by precipitation or impregnation, in particular by impregnation.

The powders of inventive catalysts which are generally obtained by precipitation can be admixed after the precipitation, and the inventive catalysts prepared by impregnation can, before or after the impregnation, optionally be admixed with pore formers, such as cellulose, glycerol, urea, ammonium carbonate, ammonium nitrate, melamine, carbon fibers or mixtures thereof, and, using customary aids, such as binders, for example formic acid, polyvinylpyrrolidone (PVP), polysilicic acid or mixtures thereof and optionally lubricants such as graphite, stearic acid, molybdenum sulfide or mixtures thereof can be tableted, extruded or brought into any desired shape and optionally then processed for particles.

Suitable inventive catalysts are non zeolitic masses, for example those without a channel structure; also excluded are activated carbons and those which are doped.

The inventive catalysts can optionally be activated before or after the shaping at temperatures of from 250 to 750° C., for example in the presence of hydrogen, carbon monoxide, dinitrogen monoxide or mixtures thereof, or generally in a reducing gas atmosphere, in particular in the case of copper catalysts or molybdenum catalysts.

In conjunction with a fuel cell system, the inventive process can generally be provided upstream, that is to say downstream of the inventive purification of the hydrocarbonaceous gas this can be used to produce hydrogen which feeds the fuel cell. The inventive process is suitable for all known types of fuel cells, such as PEM fuel cells, phosphoric acid fuel cells (PAFC), molten-carbonate fuel cells (MCFC) and high-temperature solid oxide fuel cells (SOFC).

When the inventive process is used in the context of a fuel cell, it can be advantageous not to regenerate the spent catalyst directly in the system, but to replace it and regenerate it separately after its removal. This applies, in particular, to low-power fuel cells.

In the case of fuel cells of relatively high power units, in contrast, it can be expedient to regenerate the catalyst, or at least partly regenerate it. For this the known processes can be used, for example thermal desorption at temperatures>200° C. or regeneration by means of reduction/reoxidation of the catalyst, likewise at relatively high temperatures.

The inventive process is suitable for stationary and nonstationary applications. Preference for the use in the stationary sector is given, for example, to fuel-cell systems for the simultaneous generation of electricity and heat (such as block heat and power stations), preferably in the case of domestic energy supply. Preferably, for the use in the non-stationary sector, the process can be used for purifying hydrocarbons for fuel cells in cars, trucks, buses or locomotives, preferably cars and trucks, particularly preferably cars. It is equally suitable whether the fuel cells are only used for on-board power generation or for the drive.

EXAMPLES

Preparation of the Catalysts

Catalyst 1

Composition: 52.5% by weight of CuO; 30% by weight of ZnO and 17.5% by weight of $Al_2O_3$ A mixture of a nitric acid solution of 420 g of copper(II) oxide, a nitric acid solution of 240 g of zinc oxide and a nitric acid solution of 140 g of aluminum nitrate nonahydrate was precipitated at a pH of approximately 6 using a solution of 474 g of sodium carbonate in 2 liters of demineralized water into a water reservoir held at 50° C. and stirred for a further 3 h. The precipitate was separated off, freed from sodium and nitrate ions by washing with water, dried at 120° C. and calcined for 1 h at 400° C. This produced 272 g of the mixed oxide which was compressed with addition of 1% by weight of graphite to form 20 mm tablets, mechanically forced through a screen<1.6 mm, again admixed with 2% by weight of graphite and pressed to form tablets of dimension 5×3 mm (diameter×height). The lateral compressive strength of the tablets was 66 N.

Catalyst 2

Composition: 40% by weight of CuO; 40% by weight of ZnO and 20% by weight of $Al_2O_3$ In a similar manner to Catalyst 1, a mixture of a nitric acid solution of 120 g of copper(II) oxide, a nitric acid solution of 120 g of zinc oxide and 60 g of dispersed aluminum oxide (Pural® SFC from SASOL) was precipitated at a pH of approximately 6.5 using a solution of 474 g of sodium carbonate in 2 liters of demineralized water and worked up. Calcination was performed for 2 h at 300° C. This produced 235 g of the mixed oxide which, similarly to Catalyst 1, was processed to form tablets having a lateral compressive strength of 71 N.

Catalyst 3

Composition: 73.9% by weight of CuO; 21.1% by weight of ZnO and 5% by weight of $ZrO_2$ In a similar manner to Catalyst 1, a mixture of a nitric acid solution of 370 g of copper(II) oxide, a nitric acid solution of 105.5 g of zinc oxide and a nitric acid solution of 25 g of zirconium carbonate was precipitated with a solution of 474 g of sodium carbonate in 2 liters of demineralized water at a precipitation temperature of 70° C. and a pH of about 6.5 and was worked up. Calcination was performed for 4 h at 300° C. This produced 540 g of the mixed oxide which, similarly to Catalyst 1, was processed to form tablets having a lateral compressive strength of 66 N.

Catalyst 4

Composition: 50% by weight of CuO; 30% by weight of ZnO and 17.5% by weight of $Al_2O_3$ and 2.5% by weight of $ZrO_2$ In a similar manner to Catalyst 1, a mixture of a nitric acid solution of 150 g of copper(II) oxide, a nitric acid solution of 90 g of zinc oxide, a nitric acid solution of 386.3 g of aluminum nitrate nonahydrate and a nitric acid solution of 7.5 g of zirconium carbonate which had been adjusted to a pH of approximately 2.5 with sodium carbonate was precipitated at room temperature and a pH of approximately 8 using a mixture of 2 molar sodium hydroxide solution and 0.3 molar sodium carbonate solution, held for 2 h at 50° C. and worked up. Calcination was performed for 4 h at 600° C. This produced 300 g of the mixed oxide which, similarly to Catalyst 1, was processed to form tablets having a lateral compressive strength of 101 N.

Catalyst 5

Composition: 60% by weight of CuO; 20% by weight of ZnO, 17.5% by weight of $Al_2O_3$ and 2.5% by weight of $ZrO_2$ This catalyst was prepared in a similar manner to Catalyst 4. The compressive strength of the tablets was 100 N.

Catalyst 6

Composition: 67% by weight of CuO, 26.4% by weight of ZnO and 6.6% by weight of $Al_2O_3$ A solution of 320 g of $Zn(NO_3)_2.6H_2O$ and 336.4 g of $Al(NO_3)_3.9H_2O$ in 600 ml of water and 2000 ml of a 20% strength by weight soda solution were combined in such a manner that the precipitation was performed with stirring at a temperature of 50° C. and a pH of from 6.7 to 6.9, the mixture was further stirred for 30 minutes, filtered and then washed to be free of sodium and nitrate, dried for 12 h at 120° C. and calcined for 2 h at 350° C.

The previously obtained calcined ZnAl mixed oxide was dissolved in a nitric acid solution of copper nitrate and zinc nitrate in such a manner as to produce an overall atomic ratio of Cu:Zn:Al=65:25:10 and was combined with 2000 ml of a 20% strength by weight soda solution in a similar manner to the above-described precipitation procedure at 70° C. and a pH of approximately 6.8, the mixture was further stirred for 60 minutes, filtered, and then washed to be free of sodium and nitrate, dried for 16 h at 120° C. and calcined for 4 h at 300° C.

This produced 320 g of the mixed oxide which, in a similar manner to Catalyst 1, was processed to form tablets having a compressive strength of 80 N. The BET surface area was 85 $m^2/g$ and the pore volume was 0.29 ml/g (Hg porosimetry).

Catalyst 7

Composition: 65% by weight of CuO; 20% by weight of ZnO; 6% by weight of $Al_2O_3$; 6% by weight of $ZrO_2$ and 3% by weight of $La_2O_3$ This was prepared in a similar manner to Catalyst 2 using a nitric acid solution of 215 g of CuO, 66 g of ZnO, 145 g of $Al(NO_3)_3.9H_2O$, 20 g of $ZrO_2$ and 10 g of $La_2O_3$, but precipitation was performed at a temperature of 70° C. This produced 330 g of the mixed oxide which was processed in a similar manner to Catalyst 1 to form tablets having a lateral compressive strength of 80 N. The BET surface area was 109 $m^2/g$.

Catalyst 8

Composition: 60% by weight of CuO; 20% by weight of ZnO; 10% by weight of $Al_2O_3$; 5% by weight of $ZrO_2$ and 5% by weight of MgO The preparation was performed in a similar manner to Catalyst 2 using a nitric acid solution of 231 g of CuO, 77 g of ZnO, 290 g of $Al(NO_3)_3.9H_2O$, 19.2 g of $ZrO_2$ and 19.5 g of MgO, but precipitation was performed at a temperature of 70° C. This produced 350 g of the mixed oxide which was processed in a similar manner to Catalyst 1 to form tablets having a lateral compressive strength of 90 N. The BET surface area was 96 $m^2/g$.

Catalyst 9

Composition: 60% by weight of CuO; 20% by weight of ZnO; 10% by weight of $Al_2O_3$; 5% by weight of $ZrO_2$ and 5% by weight of NiO The preparation was performed in a similar manner to Catalyst 2 using a nitric acid solution of 264 g of CuO, 88 g of ZnO, 323 g of $Al(NO_3)_3 \cdot 9H_2O$, 22 g of $ZrO_2$ and 22 g of NiO, but precipitation was performed at a temperature of 70° C. This produced 400 g of the mixed oxide which was processed in a similar manner to Catalyst 1 to form tablets having a lateral compressive strength of 80 N. The BET surface area was 114 $m^2/g$.

Catalyst 10

Composition: 60% by weight of CuO; 20% by weight of ZnO; 10% by weight of $Al_2O_3$; 5% by weight of $ZrO_2$ and 5% by weight of $SiO_2$ The preparation was performed in a similar manner to Catalyst 2 using a nitric acid solution of 200 g of CuO, 66 g of ZnO, 241 g of $Al(NO_3)_3 \cdot 9H_2O$, 16.5 g of $ZrO_2$ and 16.5 g of $SiO_2$ (colloidal; Ludox™; 50% by weight in water), but precipitation was performed at a temperature of 70° C. This produced 300 g of the mixed oxide which was processed in a similar manner to Catalyst 1 to form tablets having a lateral compressive strength of 90 N. The BET surface area was 125 $m^2/g$.

Catalyst 11

Impregnated catalyst of composition: 14.6% by weight of CuO, 7.4% by weight of ZnO and 78% by weight of $Al_2O_3$ 1.77 kg of aluminum oxide rods having a diameter of 4 mm and a water absorption of 0.557 ml/g were impregnated from a supernatant aqueous solution of 343 g of copper nitrate/liter and 156 g of zinc nitrate/liter, dried at 120° C. and calcined for 3 h at 520° C. The impregnation operation including drying and calcination was repeated. This produced 2 100 g of the impregnated catalyst having a liter weight of 844 g/liter, a water absorption of 0.44 ml/g and a cutting hardness of 266 N.

Catalyst 12

Impregnated catalyst of composition: 71.15% by weight of $Al_2O_3$, 18% by weight of $MoO_3$, 7.5% by weight of CuO and 3.35% by weight of BaO 294 g of aluminum oxide rods in the form of 3 mm trilobes were charged, impregnated with 89 g of ammonium heptamolybdate in 224 ml of water (81% strength by weight), dried at 120° C. and then calcined for 75 minutes at 370° C. and for 135 minutes at 400° C. The rods were then impregnated with 155 ml of a 19% strength by weight copper nitrate solution and then dried and calcined as previously. Finally the catalyst was impregnated with 260 ml of a solution comprising 230 g of barium nitrate and then again dried and calcined as previously. This produced 405 g of the impregnated catalyst having a packing density of 750 g/liter, a water absorption of 0.5 ml/g and a cutting hardness of 9.5 N.

Use Examples of the Catalysts

A heatable tubular reactor having a diameter of 10 mm was charged in each case with 10 g of one of the above-described catalysts in particle form (1 to 2 mm) and operated in straight flow-through mode. The outlet gas was fed to a gas chromatograph for detection of organic carbon compounds by a flame-ionization detector and for selective sulfur detection by a flame-photometric detector.

After completion of the experiment, that is to say after breakthrough of the sulfur components, the catalyst was removed and the sulfur content determined by means of standard methods (for example as described by Ehrenberger; "Quantitative Organische Elementaranalyse" [Quantitative Organic Elemental Analysis], VCH Verlagsgesellschaft, Weinheim, 1991, pages 242 ff.).

Use Example 1

Catalysts 1 to 15 were exposed to a methane stream which comprised 1000 ppm of COS. The gas space velocity, that is to say the volume of gas per volume of catalyst was 1000 $h^{-1}$, and the reaction temperature 25° C. The experiment was terminated as soon as the amount of COS in the outlet gas exceeded 1 ppm.

Table A summarizes the results of the sulfur content of the catalysts then removed immediately.

Use Example 2

Catalysts 1 to 15 were exposed to a methane stream which comprised 1000 ppm of $H_2S$. The gas space velocity, that is to say the volume of gas per volume of catalyst, was 1000 $h^{-1}$, and the reaction temperature 25° C. The experiment was terminated as soon as the amount of $H_2S$ in the outlet gas exceeded 1 ppm.

Table A summarizes the results of the sulfur content of the catalysts then removed immediately.

Use Example 3

Catalysts 1 to 15 were exposed to a methane stream which comprised 500 ppm of $H_2S$ and 500 ppm of COS. The gas space velocity, that is to say the volume of gas per volume of catalyst, was 1000 $h^{-1}$, and the reaction temperature 25° C. The experiment was terminated as soon as the amount of $H_2S$ and COS in the outlet gas together exceeded 1 ppm.

Table A summarizes the results of the sulfur content of the catalysts then removed immediately.

Use Example 4

Catalysts 1 to 15 were exposed to a gas stream consisting of 60% by volume of methane and 40% of propane, which additionally comprised 500 ppm of $H_2S$ and 500 ppm of COS and, in addition, 2000 ppm of toluene. The gas space velocity, that is to say the volume of gas per volume of catalyst, was 1000 $h^{-1}$, and the reaction temperature 25° C. The experiment was terminated as soon as the amount of $H_2S$ and COS in the outlet gas together exceeded 1 ppm.

Table A summarizes the results of the sulfur content of the catalysts then removed immediately.

From Table A it can be concluded that COS and $H_2S$ continue to be completely adsorbed to the catalyst independently of the presence of higher hydrocarbons. No adsorption of higher hydrocarbons (such as toluene) to the catalyst was observed.

TABLE A

| | Sulfur content [% by weight] | | | |
|---|---|---|---|---|
| Catalyst | Use example 1 | Use example 2 | Use example 3 | Use example 4 |
| 1 | 8.8 | 8.6 | 8.8 | 8.9 |
| 2 | 7.0 | 6.7 | 6.8 | 6.9 |
| 3 | 12.3 | 12.0 | 12.1 | 12.0 |
| 4 | 8.5 | 8.0 | 8.1 | 8.0 |
| 5 | 9.5 | 9.2 | 9.4 | 9.4 |

TABLE A-continued

| | Sulfur content [% by weight] | | | |
|---|---|---|---|---|
| Catalyst | Use example 1 | Use example 2 | Use example 3 | Use example 4 |
| 6 | 11.2 | 11.0 | 11.0 | 10.9 |
| 7 | 11.2 | 11.0 | 11.2 | 11.2 |
| 8 | 10.5 | 10.2 | 10.5 | 10.4 |
| 9 | 10.4 | 10.1 | 10.2 | 10.3 |
| 10 | 10.9 | 10.2 | 10.1 | 10.0 |
| 11 | 2.5 | 2.1 | 2.3 | 2.25 |
| 12 | 1.1 | 1.0 | 0.9 | 0.9 |

Use Example 5

Before the start of the experiment, the catalyst was reduced at a temperature of approximately 200° C. and a gas stream of approximately 1% by volume of hydrogen in nitrogen.

The Catalysts 1 to 15 thus reduced were exposed to a methane stream which comprised 15 ppm by volume of tetrahydrothiophene (THT). The gas space velocity, that is to say the volume of gas per volume of catalyst, was 1000 h$^{-1}$, and the reaction temperature 25° C. The experiment was terminated as soon as the amount of THT in the outlet gas exceeded 1 ppm.

Table B summarizes the results of the adsorption capacity of the catalyst for THT up to termination.

Use Example 6

The experiments were carried out in a similar manner to Use example 5, but the catalysts were not reduced before the start of the experiment.

Table B summarizes the results of the adsorption capacity of the catalyst for THT up to termination.

It can be concluded from Table B that the adsorption was less than in Use example 5 in which the catalysts were used in reduced form.

Use Example 7

To study an optimized adsorber cartridge, the following procedure was followed: instead of methane, natural gas is used. This essentially has the composition specified hereinafter: 84% by volume of methane, 3.5% by volume of ethane, 0.6% by volume of propane, 9.3% by volume of nitrogen, 1.6% by volume of carbon dioxide and, in total, approximately 3500 ppm of higher hydrocarbons ($C_3$-$C_8$).

The following constituents were admixed to the natural gas: 20 ppm of COS, 20 ppm of $H_2S$ and 15 ppm of THT.

The charged catalyst is pre-reduced in each case to 80%, so that approximately 80% of the catalyst bed is optimized for the uptake of THT, whereas the remainder is available for the adsorption of COS and $H_2S$.

The gas space velocity, that is to say the volume of gas per volume of catalyst, is again 1000 l/l*h$^{-1}$; the reaction temperature is 25° C. The experiment is terminated when in the off gas downstream of the reactor THT is first detected at >1 ppm. The adsorption capacity of the catalyst is calculated in g of THT/liter of catalyst via the gas volumetric flow rate passed up to this time point over the catalyst. In all cases, up to this time point, neither COS nor $H_2S$ was detectable in the reactor off-gas.

Catalysts 1 to 15 were exposed to a methane stream which comprised 1000 ppm of COS. The gas velocity, that is to say the volume of gas per volume of catalyst, was 1000 h$^{-1}$, and the reaction temperature 25° C. The experiment was terminated as soon as the amount of COS in the outlet gas exceeded 5 ppm.

Table B summarizes the results of the adsorption capacities for sulfurous components.

TABLE B

| | THT Adsorption capacity [g of THT per liter of catalyst] | | |
|---|---|---|---|
| Catalyst | Use example 5 | Use example 6 | Use example 7 |
| 1 | 3.2 | 1.5 | 2.5 |
| 2 | 2.5 | 1.1 | 2.0 |
| 3 | 4.6 | 2.2 | 3.5 |
| 4 | 3.1 | 1.6 | 2.5 |
| 5 | 3.6 | 1.8 | 2.8 |
| 6 | 4.1 | 1.9 | 3.2 |
| 7 | 3.8 | 1.8 | 3.0 |
| 8 | 3.6 | 1.8 | 2.8 |
| 9 | 3.7 | 2.0 | 3.0 |
| 10 | 3.5 | 1.6 | 2.8 |
| 11 | 0.9 | 0.4 | 0.7 |
| 12 | 0.3 | 0.1 | 0.2 |

Comparative Examples

Comparative Example 1

In a similar manner to Use example 6, commercial Cu-doped activated carbon (G 32-J® from Süd-Chemie; having 4.5% by weight of Cu; 0.25 ml/g pore volume and 1000 m$^2$/g surface area) was studied as 1-2 mm particles.

The THT adsorption capacity of this activated carbon was 0.9 g of THT per liter of activated carbon.

Comparative Example 2

In a manner to Use example 6, commercial activated carbon (C38/4®, Article 2722 from CarboTech., Essen) was studied.

The THT adsorption capacity of this activated carbon was 6.5 g of THT per liter of activated carbon.

Comparative Example 3

In a similar manner to Use example 6, commercial activated carbon (Norit® RB4 from Norit; having 0.13 ml/g pore volume; 1292 m$^2$/g surface area) was studied as 1 to 2 mm particles.

The THT adsorption capacity of this activated carbon was 0.5 g of THT per liter of activated carbon.

Comparative Example 4

In a similar manner to Use example 6, commercial activated carbon (Desorex® K from Lurgi; having 0.55 ml/g pore volume; 1494 m$^2$/g surface area) was studied as 1 to 2 mm particles.

The THT adsorption capacity of this activated carbon was 0.6 g of THT per liter of activated carbon.

Comparative Example 5

In a similar manner to Use example 1, commercial Cu-doped activated carbon (G 32-J® from Süd-Chemie; having 4.5% by weight of Cu; 0.25 ml/g pore volume and 1000 m²/g surface area) was studied as 1 to 2 mm particles.

The COS adsorption capacity of this activated carbon was 1.1 g of COS per liter of activated carbon.

Comparative Example 6

In a similar manner to Use example 1, commercial activated carbon (Norit® RB4 from Norit; having 0.13 ml/g pore volume; 1292 m²/g surface area) was studied as 1 to 2 mm particles.

The COS adsorption capacity of this activated carbon was 0.6 g of COS per liter of activated carbon.

Comparative Example 7

In a similar manner to Use example 1, commercial activated carbon (Desorex® K from Lurgi; having 0.55 ml/g pore volume; 1494 m²/g surface area) was studied as 1 to 2 mm particles.

The COS adsorption capacity of this activated carbon was 0.55 g of COS per liter of activated carbon.

Catalyst 13

Composition: 1.5% by weight of CoO, 7% by weight of $MoO_3$ and 91.5% by weight of $Al_2O_3$ 1981 g of aluminum oxide (Pural® SB from SASOL) and 140 g of ammonium hepta-molybdate ($(NH_4)_6Mo_7O_{24} \cdot 4H_2O$) were mixed dry, admixed with a solution of 69 ml of formic acid (85%) in 458 ml of water and then admixed with a further 500 ml of water and kneaded. The resultant plastic mixture was extruded at an inlet pressure of 260 bar to form rods of length from 3 to 8 mm and a diameter of 1.5 mm, dried at 120° C. for 7 h and then calcined at 550° C. for 3 h. The resultant rods were treated by spraying on a mixture of 102 g of a 15.9% strength by weight cobalt nitrate solution in 420 ml of water, again drying them at 120° C. for 7 h, and calcining at 550° C. for 3 h. The resultant catalyst had a liter weight of 736 g/liter, a cutting hardness of 12.5 N, a BET surface area of 250 m²/g, a loss on ignition (at 900° C.) of 1.4% by weight and a composition of 1.5% by weight of CoO, 7% by weight of $MoO_3$ and 91.5% by weight of $Al_2O_3$.

Catalyst 14

Composition: 4.5% by weight of CoO, 22% by weight of $MoO_3$ and 73.5% by weight of $Al_2O_3$ In a similar manner to catalyst 13, 1641 g of aluminum oxide, 455.1 g of ammonium heptamolybdate, 57 ml of formic acid (85%) in 379 ml of water and an additional 440 ml of water were reacted, extruded, dried, calcined; the resultant rods were treated by spraying on a mixture of 356 g of a 15.9% strength by weight cobalt nitrate solution in 121 ml of water with a two-phase nozzle and nitrogen as atomization gas onto a rotating disk heated to 160° C., dried and calcined. The resultant catalyst had a liter weight of 915 g/liter, a cutting hardness of 14.7 N, a BET surface area of 241 m²/g, a loss on ignition (at 900° C.) of 2.7% by weight and a composition of 4.5% by weight of CoO, 22% by weight of $MoO_3$ and 73.5% by weight of $Al_2O_3$.

Catalyst 15

Composition: 3% by weight of CoO, 15% by weight of $MoO_3$, 4.4% by weight of $SiO_2$ and 77.6% by weight of $Al_2O_3$ In a similar manner to Catalyst 14, 1749 g of silicon aluminum mixed oxide having an $SiO_2$ content of 5% by weight (SIRAL® 5 from SASOL) and 305.4 g of ammonium heptamolybdate, 61 ml of formic acid (85%) in 404 ml of water and an additional 500 ml of water were reacted, extruded at an inlet pressure of 171 bar, dried, calcined; the resultant rods were treated by spraying on a mixture of 222 g of 15.9% strength by weight cobalt nitrate solution in 384 ml of water, dried and calcined. The resultant catalyst had a liter weight of 770 g/liter, a cutting hardness of 14.8 N, a BET surface area of 307 m²/g, a loss on ignition (at 900° C.) of 2.2% by weight and a composition of 3% by weight of CoO, 15% by weight of $MoO_3$, 4.4% by weight of $SiO_2$ and 77.6% by weight of $Al_2O_3$.

Catalyst 16

Composition: 3% by weight of CoO, 15% by weight of $MoO_3$, 4.3% by weight of $SiO_2$ and 77.7% by weight of $Al_2O_3$ In a similar manner to Catalyst 14, 1586 g of silicon aluminum mixed oxide having an $SiO_2$ content of 5% by weight (SIRALOX® 5 from SASOL) and 343.6 g of ammonium heptamolybdate, 56 ml of formic acid (85%) in 366 ml of water and an additional 750 ml of water were reacted, extruded at an inlet pressure of 117 bar, dried, calcined; the resultant rods were treated by spraying on a mixture of 234 g of a 15.9% strength by weight cobalt nitrate solution in 729 ml of water, dried and calcined. The resultant catalyst had a liter weight of 602 g/liter, a cutting hardness of 3.95 N, a BET surface area of 265 m²/g, a loss on ignition (at 900° C.) of 2.6% by weight and a composition of 3% by weight of CoO, 15% by weight of $MoO_3$, 4.3% by weight of $SiO_2$ and 77.7% by weight of $Al_2O_3$.

Catalyst 17

Composition: 3% by weight of CoO, 15% by weight of $MoO_3$ and 82% by weight of $Al_2O_3$ In a similar manner to Catalyst 14, 1581 g of aluminum oxide (PURALOX® SCCa 5/150 from SASOL), 353.3 g of ammonium heptamolybdate, 55 ml of formic acid (85%) in 365 ml of water and an additional 750 ml of water were reacted, extruded at an inlet pressure of 200 bar, dried, calcined; the resultant rods were treated by spraying on a mixture of 233 g of a 15.9% strength by weight cobalt nitrate solution in 448 ml of water, dried and calcined. The resultant catalyst had a liter weight of 705 g/liter, a cutting hardness of 2.65 N, a BET surface area of 167 m²/g, a loss on ignition (at 900° C.) of 2.8% by weight and a composition of 3% by weight of CoO, 15% by weight of $MoO_3$ and 82% by weight of $Al_2O_3$.

Catalyst 18

Composition: 3% by weight of CoO, 15% by weight of $MoO_3$ and 82% by weight of $SiO_2$ 1360 g of silicon dioxide rod supports (from BASF) of a diameter of 1.5 mm were treated by spraying on a mixture of 286 g of ammonium heptamolybdate ($(NH_4)_6Mo_7O_{24} \cdot 4H_2O$) in 1075 ml of water using a two-phase nozzle and nitrogen as atomizing gas in a rotating drum heated to 160° C., dried at 120° C. for 7 h and calcined at 550° C. for 3 h.

The resultant rods were treated by spraying on a mixture of 780 g of a 15.9% strength by weight cobalt nitrate solution in 1106 ml of $H_2O$, dried and calcined. The resultant catalyst had a liter weight of 530 g/liter, a cutting hardness of 7.88 N, a BET surface area of 51.1 m²/g, a loss on ignition (at 900° C.) of 6.2% by weight and a composition of 3% by weight of CoO, 15% by weight of $MoO_3$ and 82% by weight of $SiO_2$.

Catalyst 19

Composition: 3% by weight of CoO, 15% by weight of $MoO_3$ and 82% by weight of $TiO_2$ In a similar manner to Catalyst 18, 1421 g of titanium dioxide rod supports (FINNTI® S 150 from Kemira) with a diameter of 1.5 mm were treated by spraying on a mixture of 306 g of ammonium heptamolybdate in 785 ml of water, dried, calcined; the resultant rods were treated by spraying on a mixture of 257 g of a 15.9% by weight cobalt nitrate solution, dried and calcined. The resultant catalyst had a liter weight of 1142 g/liter, a cutting hardness of 5.0 N, a BET surface area of 72.7 m²/g, a loss on ignition (at 900° C.) of 6.9% by weight and a composition of 3% by weight of CoO, 15% by weight of $MoO_3$ and 82% by weight of $TiO_2$.

Catalyst 20

Composition: 3% by weight of CoO, 15% by weight of $MoO_3$, 15.6% by weight of CaO and 66.4% by weight of $Al_2O_3$ In a similar manner to Catalyst 18, 1052 g of calcium aluminum mixed oxide (80% by weight of $Al_2O_3$ and 20% by weight of CaO; 4 mm extrudates) were treated, as 1 to 2 mm particles, by spraying on a mixture of 217 g of ammonium heptamolybdate in 763 ml of water, dried, calcined; the resultant particles were treated by spraying on a mixture of 210 g of a 15.9% by weight cobalt nitrate solution in 279 ml of water, dried and calcined. The resultant catalyst had a liter weight of 1134 g/liter, a BET surface area of 142.1 m²/g, a loss on ignition (at 900° C.) of 6.0% by weight and a composition of 3% by weight of CoO, 15% by weight of $MoO_3$, 15.6% by weight of CaO and 66.4% by weight of $Al_2O_3$.

Catalyst 21

Composition: 3% by weight of CoO, 15% by weight of $MoO_3$ and 82% by weight of $ZrO_2$ In a similar manner to Catalyst 18, 1383 g of zirconium dioxide supports (from BASF; packing density 1126 g/l; BET surface area 79 m²/g) were treated, as 1 to 2 mm particles, by spraying on a mixture of 286 g of ammonium heptamolybdate in 987 ml of water, dried, calcined; the resultant particles were treated by spraying on a mixture of 282 g of a 15.9% strength by weight cobalt nitrate solution in 19 ml of water, dried and calcined. The resultant catalyst had a liter weight of 1134 g/liter, a BET surface area of 51.2 m²/g, a loss on ignition (at 900° C.) of 1.7% by weight and a composition of 3% by weight of CoO, 15% by weight of $MoO_3$ and 82% by weight of $ZrO_2$.

Catalyst 22

Composition: 3% by weight of CoO, 15% by weight of $MoO_3$, 15.7% by weight of MgO and 66.3% by weight of $Al_2O_3$ In a similar manner to Catalyst 18, 750 g of magnesium aluminum mixed oxide support (BASF; rods 4 mm; 81.3% by weight of $Al_2O_3$ and 18.7% by weight of MgO) were treated, as 1 to 2 mm particles, by spraying on a mixture of 138 g of ammonium heptamolybdate in 335 ml of water, dried, calcined; the resultant particles were treated by spraying on a mixture of 143 g of a 15.9% strength by weight cobalt nitrate solution in 314 ml of water, dried and calcined. The resultant catalyst had a liter weight of 752 g/liter, a BET surface area of 179.2 m²/g, a loss on ignition (at 900° C.) of 5.5% by weight and a composition of 3% by weight of CoO, 15% by weight of $MoO_3$, 15.7% by weight of MgO and 66.3% by weight of $Al_2O_3$.

Catalyst 23

Composition: 3% by weight of CoO, 15% by weight of $MoO_3$ and 82% by weight of $Al_2O_3$ In a similar manner to Catalyst 18, 915 g of an aluminum oxide calcined for 8 h at 975° C. (from SASOL) in the form of spheres of a diameter 1 mm were treated by spraying on a mixture of 207 g of ammonium heptamolybdate in 745 ml of water, dried, calcined; the resultant spheres were treated by spraying on a mixture of 191 g of a 15.9% strength by weight cobalt nitrate solution in 304 ml of water, dried and calcined. The resultant catalyst had a liter weight of 977 g/liter, a BET surface area of 109 m²/g, a loss on ignition (at 900° C.) of 1.8% by weight and a composition of 3% by weight of CoO, 15% by weight of $MoO_3$ and 82% by weight of $Al_2O_3$.

Catalyst 24

Composition: 3% by weight of CoO, 15% by weight of $MoO_3$ and 82% by weight of $Al_2O_3$ In a similar manner to Catalyst 18, 700 g of an aluminum oxide calcined at 975° C. for 8 h (from SASOL) in the form of spheres of diameter 1.8 mm were treated by spraying on a mixture of 158 g of ammonium heptamolybdate in 570 ml of water, dried, calcined; the resultant spheres were treated by spraying on a mixture of 141 g of a 15.9% strength by weight cobalt nitrate solution in 354 ml of water, dried and calcined. The resultant catalyst had a liter weight of 771 g/liter, a BET surface area of 99 m²/g, a loss on ignition (at 900° C.) of 3.4% by weight and a composition of 3% by weight of CoO, 15% by weight of $MoO_3$ and 82% by weight of $Al_2O_3$.

Catalyst 25

Composition: 3.3% by weight of CoO, 14% by weight of $MoO_3$ and 82.7% by weight of $Al_2O_3$ In a similar manner to Catalyst 14, 1581 g of aluminum oxide (PURALOX® SCCa 5/150 from SASOL), 353 g of ammonium heptamolybdate, 55 ml of formic acid (85%) in 365 ml of water and an additional 750 ml of water were reacted, extruded at an inlet pressure of 200 bar, dried, calcined; the resultant rods were treated by spraying on a mixture of 233 g of a 15.9% strength by weight cobalt nitrate solution in 448 ml of water, dried and calcined. The resultant rods had a liter weight of 705 g/liter, a cutting hardness of 2.65 N, a BET surface area of 167 m²/g, a loss on ignition (at 900° C.) of 2.8% by weight and a composition of 3.3% by weight of CoO, 14% by weight of $MoO_3$ and 82.7% by weight of $Al_2O_3$. The preparation pathway is repeated 6×.

7420 g of these rods were ground to particles of 0.3-0.7 mm, mixed with 222.6 g of graphite and shaped to form tablets of a diameter of 1.5 mm and height of 2.5 mm. The tablets had a lateral compressive strength of 40 N, a tamped weight of 906 g/l, a surface area of 236 m²/g and a loss on igniton (at 900° C.) of 5.8% by weight.

Catalyst 26

Composition: 3.3% by weight of CoO, 14% by weight of $MoO_3$ and 82.7% by weight of $Al_2O_3$ 150 liters of water comprising 5 kg of formic acid were added to 250 kg of aluminum oxide (Pural® SB from SASOL). After a viscous paste is formed, 90 kg of the phosphoric acid molybdenum solution, produced by reacting 600 kg of molybdenum trioxide (purity 90%; powder) in 200 kg of orthophosphoric acid and 1500 liters of water at 100° C. for 3 h and at 40° C. for 24 h and filtering, were kneaded for 2 h, extruded to form 1.7 mm round rods, dried at from 120 to 150° C. and calcined at 550° C.

200 kg of the support thus produced were impregnated with a supernatant 6% strength by weight cobalt nitrate solution for 2 h, dried at 120° C. for 7 h and calcined at 450° C. for 3 h. The resultant catalyst had a liter weight of 610 g/l, a cutting hardness of 5.3 N, a loss on ignition (at 900° C.) of 6.39% by weight and a composition of 3.3% by weight of CoO, 14% by weight of $MoO_3$ and 82.7% by weight of $Al_2O_3$.

Catalyst 27

Composition: 3.3% by weight of CoO, 14% by weight of $MoO_3$ and 82.7% by weight of $Al_2O_3$ The production was carried out in a similar manner to Catalyst 26. In addition, the product was further heated at 500° C. for 2 h. The resultant catalyst had a liter weight of 613 g/l, a cutting hardness of 5.1 N, a loss on ignition (at 900° C.)

of 5.5% by weight and a composition of 3.3% by weight of CoO, 14% by weight of MoO$_3$ and 82.7% by weight of Al$_2$O$_3$.

Catalyst 28

Composition: 3.3% by weight of CoO, 14% by weight of MoO$_3$ and 82.7% by weight of Al$_2$O$_3$ The production was performed in a similar manner to Catalyst 26. In addition, the product was further heated at 600° C. for 2 h. The resultant catalyst had a liter weight of 627 g/l, a cutting hardness of 5.1 N, a loss on ignition (at 900° C.) of 4.6% by weight and a composition of 3.3% by weight of CoO, 14% by weight of MoO$_3$ and 82.7% by weight of Al$_2$O$_3$.

Catalyst 29

Composition: 3.3% by weight of CoO, 14% by weight of MoO$_3$ and 82.7% by weight of Al$_2$O$_3$ The production was performed in a similar manner to Catalyst 26. In addition, the product was further heated at 700° C. for 2 h. The resultant catalyst had a liter weight of 644 g/l, a cutting hardness of 4.3 N, a loss on ignition (at 900° C.) of 4.2% by weight and a composition of 3.3% by weight of CoO, 14% by weight of MoO$_3$ and 82.7% by weight of Al$_2$O$_3$.

Catalyst 30

Composition: 7.5% by weight of MoO$_3$ and 92.5% by weight of Al$_2$O$_3$

In a similar manner to Catalyst 14, 1981 g of aluminum oxide (PURAL® SB from SASOL), 140 g of ammonium heptamolybdate, 69 ml of formic acid (85%) in 468 ml of water and an additional 500 ml of water were reacted, extruded at an inlet pressure of 260 bar, dried and calcined. The resultant rods had a liter weight of 735 g/liter, a cutting hardness of 13.5 N, a loss on ignition (at 900° C.) of 1.4% by weight, a BET surface area of 261 m$^2$/g and a composition of 7.5% by weight of MoO$_3$ and 92.5% by weight of Al$_2$O$_3$.

Catalyst 31

Composition: 24% by weight of MoO$_3$ and 76% by weight of Al$_2$O$_3$

In a similar manner to Catalyst 14, 1641 g of aluminum oxide (PURAL® SB from SASOL), 455.1 g of ammonium heptamolybdate, 57 ml of formic acid (85%) in 379 ml of water and an additional 440 ml of water were reacted, extruded at an inlet pressure of 240 bar, dried and calcined. The resultant catalyst had a liter weight of 856 g/liter, a cutting hardness of 12.2 N, a loss on ignition (at 900° C.) of 9.35% by weight, a BET surface area of 252 m$^2$/g and a composition of 24% by weight of MoO$_3$ and 76% by weight of Al$_2$O$_3$.

Catalyst 32

Composition: 17% by weight of MoO$_3$, 5.4% by weight of SiO$_2$ and 77.6% by weight of Al$_2$O$_3$ In a similar manner to Catalyst 14, 1749 g of silicon aluminum mixed oxide, mixed oxide having an SiO$_2$ content of 5% by weight (SIRAL® 5 from SASOL), 305.4 g of ammonium heptamolybdate, 61 ml of formic acid (85%) in 404 ml of water and an additional 500 ml of water were reacted, extruded at an inlet pressure of 171 bar, dried and calcined. The resultant catalyst had a liter weight of 720 g/liter, a cutting hardness of 12.6 N, a loss on ignition (at 900° C.) of 7.8% by weight, a BET surface area of 315 m$^2$/g and a composition of 17% by weight of MoO$_3$, 5.4% by weight of SiO$_2$ and 77.6% by weight of Al$_2$O$_3$.

Catalyst 33

Composition: 16% by weight of MoO$_3$ and 84% by weight of SiO$_2$

In a similar manner to Catalyst 18, 1360 g of a silicon dioxide rod support (BASF) of a diameter of 1.5 mm were treated by spraying on a mixture of 286 g of ammonium heptamolybdate in 1075 ml of water, dried, calcined. The resultant catalyst had a liter weight of 520 g/liter, a cutting hardness of 7.98 N, a BET surface area of 54.1 m$^2$/g, a loss on ignition (at 900° C.) of 6.1% by weight and a composition of 16% by weight of MoO$_3$ and 84% by weight of SiO$_2$.

Examples of Use of the Catalysts

Reaction Setup and Detection

A heatable tubular reactor of a diameter of 10 mm was charged in each case with 40 ml of one of the above-described catalysts and operated in straight-through mode. The exit gas was fed to a gas chromatograph. For detection of organic carbon compounds, the GC has a flame-ionization detector, and for selective sulfur detection, a flame-photometric detector.

After completion of the experiment, that is to say after breakthrough of the sulfur component(s), the catalyst was removed and the sulfur content was determined by means of standard methods (for example as described by Ehrenberger: "Quantitative Organische Elementaranalyse" [Quantitative Organic Elemental Analysis], VCH Verlagsgesellschaft, Weinheim, 1991, pages 242 ft).

Use Example 8

Catalysts 13 to 33 were exposed, in the above-described reaction setup, to a methane stream which comprised 15 ppm of tetrahydrothiophene (THT). The gas space velocity, that is to say the volume of gas per volume of catalyst, was 7000 h$^{-1}$, the reaction temperature 25° C. The experiment was terminated as soon as the exit gas contained more than 100 ppb of sulfur. Table A summarizes the results.

Use Example 9

Catalysts 13 to 33 were exposed, in the above-described reaction setup, to a gas stream consisting of 60% by volume of methane and 40% propane, which comprised 15 ppm of tetrahydrothiophene (THT) and an additional 2000 ppm of toluene. The gas space velocity, that is to say the volume of gas per volume of catalyst, was 7000 h$^{-1}$, the reaction temperature 25° C. The experiment was terminated as soon as the exit gas comprised more than 100 ppb of sulfur. Table C summarizes the results.

TABLE C

|  | Use example 8 [g THT/l$_{cat}$] | Use example 9 [g THT/l$_{cat}$] |
| --- | --- | --- |
| Catalyst 13 | 16.1 | 15.8 |
| Catalyst 14 | 25.3 | 24.7 |
| Catalyst 15 | 17.4 | 17.0 |
| Catalyst 16 | 19.0 | 18.2 |
| Catalyst 17 | 18.4 | 18.5 |
| Catalyst 18 | 14.6 | 14.4 |
| Catalyst 19 | 23.2 | 23.0 |
| Catalyst 20 | 20.8 | 21.0 |
| Catalyst 21 | 19.1 | 18.6 |
| Catalyst 22 | 17.5 | 17.3 |
| Catalyst 23 | 21.0 | 20.7 |
| Catalyst 24 | 22.6 | 21.6 |
| Catalyst 25 | 21.2 | 20.6 |
| Catalyst 26 | 22.9 | 22.1 |
| Catalyst 27 | 20.4 | 19.8 |
| Catalyst 28 | 17.0 | 17.0 |
| Catalyst 29 | 10.2 | 10.2 |
| Catalyst 30 | 13.9 | 13.5 |

TABLE C-continued

|  | Use example 8 [g THT/l_cat] | Use example 9 [g THT/l_cat] |
| --- | --- | --- |
| Catalyst 31 | 20.7 | 20.7 |
| Catalyst 32 | 20.3 | 20.5 |
| Catalyst 33 | 21.9 | 22.0 |

Use Example 10

Catalysts 13 to 33 were exposed, in the above-described reaction set up, to a gas stream consisting of natural gas (which in the present case essentially contains 9.27% by volume of nitrogen, 1.64% by volume of carbon dioxide, 84.5% by volume of methane, 3.46% by volume of ethane, 0.579% by volume of propane and approximately 12000 ppm of other $C_2$ to $C_8$ hydrocarbons) which comprised 15 ppm of tert-butylmercaptan and 15 ppm of tetrahydrothiophene. The gas space velocity, that is to say the volume of gas per volume of catalyst was 7000 $h^{-1}$, the reaction temperature 25° C. The experiment was terminated as soon as the exit gas comprised more than 200 ppb of sulfur. Table D summarizes the results.

TABLE D

|  | Uptake of sulfurous compounds[15] [g/liter of catalyst] |
| --- | --- |
| Catalyst 13 | 16.3 |
| Catalyst 14 | 25.5 |
| Catalyst 15 | 17.0 |
| Catalyst 16 | 18.3 |
| Catalyst 17 | 17.9 |
| Catalyst 18 | 14.0 |
| Catalyst 19 | 21.7 |
| Catalyst 20 | 19.9 |
| Catalyst 21 | 17.0 |
| Catalyst 22 | 17.2 |
| Catalyst 23 | 20.2 |
| Catalyst 24 | 18.4 |
| Catalyst 25 | 19.5 |
| Catalyst 26 | 22.1 |
| Catalyst 27 | 19.9 |
| Catalyst 28 | 16.8 |
| Catalyst 29 | 10.1 |
| Catalyst 30 | 13.6 |
| Catalyst 31 | 20.8 |
| Catalyst 32 | 18.4 |
| Catalyst 33 | 22.2 |

Comparative Example 8

In a similar manner to Use example 10, commercial activated carbon (C38/4®, Article 2722 from CarboTech, Essen) was studied. The THT adsorption capacity of this activated carbon was 6.5 g of THT per liter of activated carbon.

Comparative Example 9

In a similar manner to Use example 10, commercial activated carbon (Norit® RB4 from Norit; having 0.13 ml/g pore volume; 1292 $m^2$/g surface area) was studied as from 1 to 2 mm particles. The THT adsorption capacity of this activated carbon was 0.5 g of THT per liter of activated carbon.

Comparative Example 10

In a similar manner to Use example 10, commercial activated carbon (Desorex® K from Lurgi; having 0.55 ml/g pore volume; 1494 $m^2$/g surface area) was studied as from 1 to 2 mm particles. The THT adsorption capacity of this activated carbon was 0.6 g of THT per liter of activated carbon.

Examples of the Use of the Catalysts

Reaction Setup and Detection

A heatable tubular reactor with a diameter of 30 mm was charged each time with a total of 280 ml of two of the above-described catalysts and operated in the straight-through mode. The exit gas was fed to a gas chromatograph. For the detection of organic carbon compounds, the GC has a flame-ionization detector and for the selective sulfur detection, a flame-photometric detector.

After completion of the experiment, that is to say after breakthrough of the sulfur component(s), the catalyst was removed and the sulfur content was determined by standard methods (for example as described by Ehrenberger: "Quantitative Organische Elementaranalyse" [Quantitative Organic Elemental Analysis], VCH Verlagsgesellschaft, Weinheim, 1991, pages 242 ft).

USE EXAMPLES

Use Example 11

Homogeneous mixture of the same parts by volume of copper and molybdenum catalysts.

Homogeneous mixtures of the same parts by volume of a copper catalyst and a molybdenum catalyst were used. To natural gas of the following composition:

| Nitrogen | 9.27% |
| --- | --- |
| Carbon dioxide | 1.64% |
| Methane | 84.5% |
| Ethane | 3.46% |
| Propane | 0.579% |
| Other $C_4$-$C_8$ HCs | approximately 12000 ppm by volume | were added 20 ppm by volume $H_2S$, 17 ppm by volume COS and 10 ppm by volume tetrahydrothiophene. In all experiments tetrahydrothiophene (THT) broke through the catalyst bed first. The passage times up to breakthrough of THT are reported in Table E:

TABLE E

| Mixture | Break-through time for THT [h] |
| --- | --- |
| Catalyst 1 + Catalyst 13 | 152 |
| Catalyst 2 + Catalyst 14 | 167 |
| Catalyst 4 + Catalyst 13 | 130 |
| Catalyst 4 + Catalyst 14 | 122 |
| Catalyst 4 + Catalyst 17 | 124 |
| Catalyst 4 + Catalyst 25 | 106 |
| Catalyst 11 + Catalyst 25 | 169 |

Use Example 12

Two separate beds: copper catalyst upstream of molybdenum catalyst

Beds, each of one copper catalyst and one molybdenum catalyst were used, the same volumes of the two catalysts being used. At the start of the bed (reactor inlet) was situated the copper catalyst; the molybdenum catalyst was at the end of the reactor. 20 ppm by volume of $H_2S$, 5 ppm by volume of COS and 10 ppm by volume of tetrahydrothiophene were added to the natural gas. The experimental procedure was performed in a similar manner to Use example 11. In all experiments tetrahydrothiophene (THT) broke through the catalyst bed first. The passage times up to breakthrough of THT are presented in Table F:

TABLE F

| Bed | Breakthrough time for THT [h] |
| --- | --- |
| Catalyst 1 + Catalyst 13 | 183 |
| Catalyst 2 + Catalyst 14 | 320 |
| Catalyst 4 + Catalyst 13 | 180 |
| Catalyst 4 + Catalyst 14 | 325 |
| Catalyst 4 + Catalyst 17 | 268 |
| Catalyst 4 + Catalyst 25 | 274 |
| Catalyst 11 + Catalyst 25 | 246 |

Use Example 13

Two separate beds: molybdenum catalyst upstream of copper catalyst

Beds, each of one copper catalyst and one molybdenum catalyst were used, the same volumes of the two catalysts being used. At the start of the bed (reactor inlet) was situated the molybdenum catalyst; the copper catalyst catalyst was at the end of the reactor. 20 ppm by volume of $H_2S$, 5 ppm by volume of COS and 10 ppm by volume of tetrahydrothiophene were added to the natural gas. The experimental procedure was performed in a similar manner to Use example 11. In all experiments tetrahydrothiophene (THT) broke through the catalyst bed first. The passage times up to breakthrough of THT are presented in Table G:

TABLE G

| Bed | Breakthrough time for THT in hours |
| --- | --- |
| Catalyst 13 + Catalyst 1 | 141 |
| Catalyst 14 + Catalyst 2 | 121 |
| Catalyst 13 + Catalyst 4 | 115 |
| Catalyst 14 + Catalyst 4 | 111 |
| Catalyst 17 + Catalyst 4 | 116 |
| Catalyst 25 + Catalyst 4 | 100 |
| Catalyst 25 + Catalyst 11 | 168 |

Catalyst 34

Composition: 10% by weight of $MoO_3$ and 90% by weight of $Al_2O_3$.

480 g of spray-dried aluminum oxide (Pural® SB, from SASOL, liter weight: 951 g/liter; loss on ignition 24.9% by weight) and 49 g of ammonium heptamolybdate (from Riedel de Haen) were mixed, kneaded with 85 ml of dilute (85% strength) formic acid, shaped via an extrusion press at an inlet pressure of 100 bar to form 3 mm rods, dried at 200° C. for 4 h and then calcined at 750° C. for 2 h. The catalyst had a BET surface area of 212 $m^2/g$, a liter weight of 723 g/liter and a pore volume of 0.44 ml/g.

Catalyst 35

Composition: 15% by weight of $MoO_3$ and 85% by weight of $Al_2O_3$.

451 g of the aluminum oxide from Catalyst 34 and 76 g of ammonium heptamolybdate were mixed, kneaded with 65 ml of dilute (85% strength) formic acid, shaped via an extrusion press at an inlet pressure of 90 bar to form 3 mm rods, dried at 200° C. for 4 h, and then calcined at 550° C. for 3 h. The catalyst had a BET surface area of 289 $m^2/g$, a liter weight of 884 g/liter and a pore volume of 0.40 ml/g.

Catalyst 36

Composition: 20% by weight of $MoO_3$ and 80% by weight of $Al_2O_3$.

427 g of the aluminum oxide from Catalyst 34 and 98 g of ammonium heptamolybdate were mixed, kneaded with 50 ml of dilute (85% strength) formic acid, shaped via an extrusion press at an inlet pressure of 100 bar to form 3 mm rods, dried at 200° C. for 4 h and then calcined at 750° C. for 2 h. The catalyst had a BET surface are of 294 $m^2/g$, a liter weight of 823 g/liter and a pore volume of 0.42 ml/g.

Catalyst 37

Composition: 15% by weight of $MoO_3$ on aluminum oxide containing 50% by weight of cordierite.

In a dry mixer, 230 g of aluminum oxide (Pural® SB from SASOL), 95 g of ammonium heptamolybdate and 310 g of cordierite (Mg—Al—Si mixed oxide having 20% by weight loss on ignition) were mixed, kneaded with 30 ml of dilute (85% strength) formic acid, shaped in a ram press at 130 bar to form 3 mm rods, dried at 200° C. for 4 h and then calcined at 750° C. for 2 h. The catalyst had a BET surface area of 42 $m^2/g$ and a liter weight of 1027 g/liter.

Catalyst 38

Composition: 15% by weight of $MoO_3$ and 85% by weight of $Al_2O_3$ 600 g of aluminum oxide spray powder (Pural® SB from SASOL) were kneaded with 440 ml of water and 18 ml of dilute (85% strength) formic acid, shaped in a ram press at 95 bar to form rods of 3 mm diameter, dried at 200° C. for 4 h and calcined at 750° C. for 2 h.

These rods were impregnated with a 15.5% strength by weight solution of ammonium heptamolybdate so that an Mo content of 15% by weight finally results (calculated as $MoO_3$). The catalyst was dried at 200° C. for 4 h and then calcined at 550° C. for 2 h. The extruded-rod catalyst had a BET surface area of 143 $m^2/g$, a water absorption of 0.35 ml/g and a liter weight of 1028 g/liter.

Catalyst 39

Composition: 15% by weight of $MoO_3$ and 85% by weight of $Al_2O_3$

The production was performed in a similar manner to Catalyst 38, but the aluminum oxide rods were calcined at 1050° C. for 2 h. The catalyst had a BET surface area of 87 $m^2/g$, a water absorption of 0.25 ml/g and a liter weight of 1038 g/liter.

Catalyst 40

Composition: 15% by weight of $MoO_3$ and 85% by weight of $Al_2O_3$.

600 g of an aluminum oxide extruded-rod support (from BASF) of diameter 3 mm (pore volume of 0.65 ml/g, BET surface area of 223 $m^2/g$, tamped weight of 649 g/l) were calcined at 750° C. for 2 h, then impregnated with a 15.5% strength by weight solution of ammonium heptamolybdate and then dried at 120° C. for 16 h and calcined at 550° C. for 3 hours. The catalyst had a BET surface area of 160 $m^2/g$, a liter weight of 750 g and a pore volume of 0.5 ml/g.

Catalyst 41

Composition: 15% by weight of $MoO_3$ and 85% by weight of $Al_2O_3$.

The production was performed in a similar manner to Catalyst 40, but the aluminum oxide support was calcined at 1050°

Example 42

Production of a Cu—Zn—Al—Mo catalyst of composition 37% CuO, 32% ZnO, 17% $Al_2O_3$ and 14% $MoO_3$ 495 g of the Catalyst 19 were impregnated with a 15.5% strength by weight solution of ammonium heptamolybdate, dried at 200° C. for 4 h and calcined at 550° C. for 3 h. The catalyst had a water absorption of 0.24 ml/g, a BET surface area of 38 $m^2/g$ and a liter weight of 1248 g/liter.

Example 43

Production of an Fe—Cu—Al catalyst comprising 12.5% by weight of $Fe_2O_3$, 75% by weight of CuO and 12.5% by weight of $Al_2O_3$ A solution of 260 g of iron(II) nitrate nonahydrate, 387 g of aluminum nitrate nonahydrate and 239 g of copper nitrate in 2.5 liters of water was mixed with stirring at 70° C. and a pH of 11, with a solution of 1000 g of sodium hydroxide solution in 2 liters of water, the precipitated product was washed with 50 liters of water, dried at 200° C. for 4 h, calcined at 500° C. for 2 h, admixed with 3% by weight of graphite and pressed to form 4.75×3 mm tablets. The tablets had a lateral compressive strength of 36 N/tablet, a BET surface area of 115 $m^2/g$ and a pore volume of 0.24 ml/g.

Example 44

Production of an Al—Ni catalyst comprising 75% by weight of NiO.

A solution of 775 g of aluminum nitrate nonahydrate and 729 g of nickel nitrate in 2.5 liters of water was mixed, with stirring, at 70° C. and a pH of 11, with a solution of 1000 g of sodium hydroxide solution in 2 liters of water, the precipitated product was washed with 50 liters of water, dried at 200° C. for 4 h, calcined at 500° C. for 2 h, mixed with 3% by weight of graphite and pressed to form 4.75×2 mm tablets. The tablets had a lateral compressive strength of 41 N/tablet, a BET surface area of 142 $m^2/g$ and a pore volume of 0.23 ml/g.

Example 45

Production of an Ni—Fe catalyst comprising 20% by weight of $Fe_2O_3$.

A solution of 417 g of iron(III) nitrate nonahydrate in 1.5 liters of water and 1750 g of an aqueous solution of nickel nitrate having an Ni content of 13.5% by weight was mixed, with stirring, at 70° C. and a pH of 11, with a solution of 1000 g of sodium hydroxide solution in 2 liters of water, the precipitated product was washed with 50 liters of water, dried at 200° C. for 4 h, calcined at 500° C. for 2 h, mixed with 3% by weight of graphite and pressed to form 4.75×2 mm tablets. The tablets had a lateral compressive strength of 43 N/tablet, a BET surface area of 142 $m^2/g$, and a pore volume of 0.23 ml/g.

Comparative Example 11

Production of an Ag-doped Na—Y Zeolite 250 g of an Na—Y zeolite (CBV® 100 from Zeolyst Int. having an Si/Al ratio of 5.1) were admixed, with stirring, with 2.5 l of a 0.5 molar solution of silver nitrate (424.6 g), heated to 80° C. for 4 h, the precipitated product was filtered off, washed once with 500 ml of water, dried at 120° C. for 2 h, calcined at 500° C. for 4 h (heat-up rate: 1° C./min), heated again with 2.5 l of a 0.5 molar silver nitrate solution for 4 h to 80° C., filtered off, with 500 ml of water, dried at 120° C. overnight. This produced 372 g of the zeolite.

Comparative Example 12

Na Exchange of the Ag—H—Y Zeolite 372 g of the zeolite from Comparative example 11 were admixed, with stirring, with 1860 ml of a 10% strength ammonium nitrate solution, heated at 80° C. for 4 h, the precipitated product was filtered off, again admixed with a fresh 10% strength ammonium nitrate solution (1.860 l), heated to 80° C. for 4 h, the precipitated product was filtered off, washed 2 times with 500 ml of water, dried at 120° C. for 2 h, and calcined at 450° C. for 5 h (heat-up rate: 1° C./min). This produced 150 g of the zeolite.

Comparative Example 13

Production of a Cu—H—Y Zeolite 250 g of the Na—Y zeolite (CBV® 100 from Zeolyst Int. having an Si/Al ratio of 5.1) were admixed, with stirring, with a 0.5 molar solution of copper nitrate (290 g), heated at 80° C. for 4 h, the precipitated product was filtered off, washed once with 500 ml of water, dried at 120° C. for 2 h, calcined at 500° C. for 4 h (heat-up rate: 1° C./min), heated again at 80° C. for 4 h with 2.5 l of a 0.5 molar solution of copper nitrate, filtered off, washed with 500 ml of water, dried overnight at 120° C. This produced 253 g of the zeolite.

253 g of the zeolite were heated at 80° C. for 4 h with 1200 ml of a 10% strength ammonium nitrate solution, the precipitated product was filtered off, again admixed with a fresh 10% ammonium nitrate solution (1.2 l), heated at 80° C. for 4 h, the precipitated product was filtered off, washed 2 times with 500 ml of water, dried at 120° C. for 2 h, calcined at 450° C. for 5 h (heat-up rate: 1° C./min). This produced 100.2 g of the zeolite.

Comparative Example 14

Cu-doped activated carbon type G-32 J (from Süd Chemie). The activated carbon had a copper content of 4.5% by weight, a surface area of 1120 $m^2/g$ and a bulk density of approximately 550 g/liter.

Experimental Procedure

All catalysts or adsorbers were studied as particles of fraction 1-2 mm. Only 1.5 mm rods and 1.5 mm tablets were used directly as such. The reactor used was a heatable stainless steel tube through which flow passed from top to bottom. Per experiment, 40 ml of catalyst were used.

A commercially available natural gas (from Linde) was used. This had the following composition: 84.5% by volume of methane, 3.5% by volume of ethane, 0.6% by volume of propane, 1000 ppm by volume of butanes, approximately 1200 ppm by volume of higher hydrocarbons>$C_4$ HCs; of which 100 ppm of benzene; 9.3% by volume of nitrogen and 1.7% by volume of carbon dioxide.

The gas was passed over the catalyst at a volumetric flow rate of 240 liters per hour (space-time velocity of 6000 per hour). All measurements were made at standard pressure and room temperature. There was no pretreatment of the catalysts (for example reduction).

For the analysis of the gas, downstream of the reactor a commercial gas chromatograph was used which had two-column switching and two detectors. The first detector, a flame-ionization detector (FID), served for detection of the individual hydrocarbons in the natural gas, in particular of benzene. The second detector, a flame-photometric detector (FPD) was sensitive to sulfur compounds and permitted the detection of such compounds down to a virtual limit of detection of 40 ppb.

After termination of the experiment, that is to say after breakthrough of the respective first sulfur component (detection limit approximately 40 ppb), the catalyst was removed and the sulfur content was determined by means of standard methods (for example according to Ehrenberger; "Quantitative Organische Elementaranalyse [Quantitative Organic Elemental Analysis]", VCH Verlagsgesellschaft, Weinheim, 1991, pages 242 ff.). These results were identical in all cases, with an accuracy of +/−5% to the results determined by the breakthrough of the sulfurous components during measurement.

The model substance chosen for organic sulfur compounds was tetrahydrothiophene (THT), since it is known that cyclic sulfur compounds, in contrast to terminal sulfur compounds, can only be removed by adsorption with great difficulty.

Experiments on the adsorption of inorganic sulfur compounds were carried out using COS and $H_2S$ as model substances.

Experimental Series 1: Adsorption of Organic Sulfur Compounds as Exemplified by THT To measure the adsorption of THT, the natural gas was fortified via a saturator with a mean THT content of 15 ppm by volume. For the catalysts listed, this gave the adsorption capacities specified hereinafter for THT (in g of THT/liter of catalyst) and also for benzene (in % by weight).

| Catalyst | THT Adsorption [g of THT/liter of catalyst] | Benzene Adsorption [% by weight] |
|---|---|---|
| 21 | 17.4 | 0.03 |
| 19 | 14.7 | 0.02 |
| 25 | 29.0 | 0.01 |
| 24 | 11.9 | 0.05 |
| 34 | 12.4 | 0.08 |
| 35 | 26.7 | 0.10 |
| 36 | 13.4 | 0.03 |
| 37 | 20.0 | 0.07 |
| 38 | 26.2 | 0.11 |
| 39 | 15.4 | 0.06 |
| 40 | 15.7 | 0.10 |
| 41 | 11.0 | 0.03 |
| 2 | 9.1 | 0.03 |
| 42 | 5.1 | 0.01 |
| 43 | 12.4 | 0.03 |
| 44 | 11.0 | 0.02 |
| 45 | 14.8 | 0.04 |

The results of the comparative examples are below:

| Catalyst | THT Adsorption [g of THT/liter of catalyst] | Benzene Adsorption [% by weight] |
|---|---|---|
| Comparative example 11 | 34.0 | 2.3 |
| Comparative example 12 | 16.1 | 2.1 |
| Comparative example 13 | 13.2 | 2.1 |
| Comparative example 14 | 15.9 | 1.7 |
| Comparative example 6 | 13.5 | 1.8 |
| Comparative example 7 | 14.2 | 2.0 |

The catalysts of the comparative example show a benzene adsorption increased by a factor of 50.

The table below shows the results of some inventive catalysts together with the Comparative examples 6, 7 and 11 to 14. In each case 15 ppm by volume of COS and $H_2S$ were added to the natural gas to be desulfurized. The adsorption capacity for COS and $H_2S$ was determined via sulfur determination of the catalysts after the end of the experiment. In all measurements COS broke through the catalyst bed first.

| Catalyst | Sulfur from $COS/H_2S$ [% by weight of S] | Benzene Adsorption [% by weight] |
|---|---|---|
| 2 | 7.0 | 0.04 |
| 42 | 6.5 | 0.01 |
| Comparative example 11 | 2.2 | 2.2 |
| Comparative example 12 | 1.1 | 2.2 |
| Comparative example 13 | 0.8 | 2.3 |
| Comparative example 14 | 0.5 | 1.8 |
| Comparative example 6 | 0.2 | 1.9 |
| Comparative example 7 | 0.3 | 2.2 |

It was found that the inventive catalysts can also be used for removing inorganic sulfur compounds from natural gas. High sulfur loads can be achieved. At the same time, the co-adsorption of benzene is low.

The invention claimed is:

1. A method of removing at least one sulfur compound from at least one hydrocarbon-comprising gas, comprising directly treating the at least one hydrocarbon-comprising gas comprising the at least one sulfur compound with a catalyst at 15 to 40° C. under atmospheric pressure, wherein the catalyst comprises:
   from 5 to 70% by weight of at least one selected from the group consisting of copper, silver, zinc, molybdenum, iron, cobalt, and nickel; and
   from 30 to 95% by weight of at least one oxide selected from the group consisting of magnesium, calcium, scandium, yttrium, lanthanum, titanium, zirconium, chromium, tungsten, boron, aluminum, gallium, silicon, germanium, and tin oxides;
   and excludes activated carbon and zeolites.

2. The method according to claim 1, wherein the catalyst is a copper-comprising catalyst.

3. The method according to claim 1, wherein the catalyst is a molybdenum-comprising catalyst.

4. The method according to claim 1, wherein the catalyst is a copper- and molybdenum-comprising catalyst.

5. The method according to claim 1, wherein the catalyst comprises:
   from more than 16 to 70% by weight of at least one selected from the group consisting of copper, silver, zinc, molybdenum, iron, cobalt, and nickel; and
   from 30 to less than 84% by weight of at least one oxide selected from the group consisting of magnesium, calcium, scandium, yttrium, lanthanum, titanium, zirconium, chromium, tungsten, boron, aluminum, gallium, silicon, germanium, and tin oxides;
   and excludes activated carbon and zeolites.

6. The method according to claim 1, wherein the catalyst comprises:
   from 17.6 to 70% by weight of at least one selected from the group consisting of copper, silver, zinc, molybdenum, iron, cobalt, and nickel; and
   from 30 to 82.4% by weight of at least one oxide selected from the group consisting of magnesium, calcium, scandium, yttrium, lanthanum, titanium, zirconium, chromium, tungsten, boron, aluminum, gallium, silicon, germanium, and tin oxides;
   and excludes activated carbon and zeolites.

7. The method according to claim 1, wherein the catalyst comprises at least a first and a second catalyst, which are different from one another, each independently comprising:
   from 5 to 70% by weight of at least one selected from the group consisting of copper, silver, zinc, molybdenum, iron, cobalt, and nickel; and from 30 to 95% by weight of at least one oxide selected from the group consisting of magnesium, calcium, scandium, yttrium, lanthanum, titanium, zirconium, chromium, tungsten, boron, aluminum, gallium, silicon, germanium, and tin oxides;

and excludes activated carbon and zeolites.

8. A method according to claim 1, wherein the hydrocarbon-comprising gas is natural gas.

9. A method according to claim 1, wherein the hydrocarbon-comprising gas is town gas.

10. A method according to claim 1, wherein the hydrocarbon-comprising gas is biogas.

11. A method according to claim 1, wherein the hydrocarbon-comprising gas is liquefied petroleum gas.

12. A method of removing at least one sulfur compound from at least one hydrocarbon-comprising gas for preparation of hydrogen for operation of a fuel cell, consisting essentially of directly treating the at least one hydrocarbon-comprising gas comprising the at least one sulfur compound with a catalyst at 15 to 40° C. under atmospheric pressure, wherein the catalyst comprises:

from 5 to 70% by weight of at least one selected from the group consisting of copper, silver, zinc, molybdenum, iron, cobalt, and nickel; and from 30 to 95% by weight of at least one oxide selected from the group consisting of magnesium, calcium, scandium, yttrium, lanthanum, titanium, zirconium, chromium, tungsten, boron, aluminum, gallium, silicon, germanium, and tin oxides;

and excludes activated carbon and zeolites.

* * * * *